US007999802B2

(12) United States Patent
Kim et al.

(10) Patent No.: US 7,999,802 B2
(45) Date of Patent: Aug. 16, 2011

(54) INTERFACE SYSTEM AND FLAT PANEL DISPLAY USING THE SAME

(75) Inventors: Suk-ki Kim, Suwon-si (KR); Sung-ha Kim, Suwon-si (KR); Young-kwon Jo, Suwon-si (KR)

(73) Assignee: Samsung Mobile Display Co., Ltd., Giheung-Gu, Yongin, Gyunggi-Do (KR)

( * ) Notice: Subject to any disclaimer, the term of this patent is extended or adjusted under 35 U.S.C. 154(b) by 863 days.

(21) Appl. No.: 12/068,364

(22) Filed: Feb. 5, 2008

(65) Prior Publication Data

US 2008/0252635 A1 Oct. 16, 2008

(30) Foreign Application Priority Data

Apr. 10, 2007 (KR) ........................ 10-2007-0035005

(51) Int. Cl.
*G06F 3/038* (2006.01)

(52) U.S. Cl. ............................ 345/204; 345/98; 345/99

(58) Field of Classification Search .................. 345/204, 345/98–100
See application file for complete search history.

(56) References Cited

U.S. PATENT DOCUMENTS 3,692,982 A * 9/1972 McMillin ...................... 341/141
4,729,020 A * 3/1988 Schaphorst et al. ..... 375/240.05
2002/0130797 A1* 9/2002 Calvignac et al. ............ 341/102
2003/0164811 A1* 9/2003 Kim et al. ....................... 345/87
2003/0184458 A1* 10/2003 Calvignac et al. ............ 341/102
2004/0221201 A1* 11/2004 Seroff ............................ 714/30
2005/0208838 A1* 9/2005 Horowitz et al. ............. 439/676
2005/0248370 A1* 11/2005 Li et al. ........................... 327/58
2006/0103713 A1* 5/2006 Hwang ......................... 347/171
2006/0125851 A1* 6/2006 Hwang ............................. 347/5
2006/0227124 A1* 10/2006 Kim et al. ...................... 345/204
2007/0164883 A1* 7/2007 Furtner ......................... 341/126
2007/0241836 A1* 10/2007 Miller .............................. 333/1

FOREIGN PATENT DOCUMENTS

KR 10-2002-0056306 7/2002
KR 10-2003-0069783 8/2003
KR 10-2006-0030680 4/2006

OTHER PUBLICATIONS

*Office Action* from the KIPO issued in Applicant's corresponding Korean Patent Application No. 2007-0035005 dated Jun. 24, 2008.

* cited by examiner

*Primary Examiner* — Lun-Yi Lao
*Assistant Examiner* — Gene W Lee
(74) *Attorney, Agent, or Firm* — Robert E. Bushnell, Esq.

(57) ABSTRACT

An interface system capable of minimizing an electro magnetic interference. The interface system may be constructed with a serializer for receiving a first data and second data having a plurality of bits from an external device and sequentially outputting bits of the received first data and second data; a transmission circuit including a decoder for converting two bits supplied from the serializer into three bits, a driver for controlling a flow of electric currents to correspond to the three bits and a transmission resistor to which a voltage is applied to correspond to the flow of the electric currents; a reception circuit including a reception resistor for receiving a voltage supplied the transmission resistor, amplifiers for amplifying a voltage applied to both ends of the reception resistor, comparators for recovering the three bits and an encoder for recovering the two bits using the three bit by comparing the voltage supplied to the amplifiers; a deserializer for recovering the first data and the second data while sequentially storing the two bits supplied from the reception circuit; and stabilization circuits for controlling the transmission circuit.

15 Claims, 12 Drawing Sheets

INTERFACE SYSTEM AND FLAT PANEL DISPLAY USING THE SAME

CLAIM OF PRIORITY

This application makes reference to, incorporates the same herein, and claims all benefits accruing under 35 U.S.C. §119 from an application for INTERFACE SYSTEM AND FLAT PANEL DISPLAY USING THE SAME earlier filed in the Korean Intellectual Property Office on the $10^{th}$ of Apr. 2007 and there duly assigned Serial No. 10-2007-0035005.

BACKGROUND OF THE INVENTION

1. Field of the Invention

The present invention relates to an interface system and a flat panel display using the same, and more particularly to an interface system capable of minimizing an electro magnetic interference (EMI), and a flat panel display using the same.

2. Description of the Related Art

In recent years, there have been developed a variety of flat panel displays capable of reducing the weight and volume of a cathode ray tube, which is one defect in the cathode ray tube. The flat panel display includes a liquid crystal display (LCD), a field emission display (FED), a plasma display panel (PDP), an organic light emitting display (OLED), etc.

Such a flat panel display uses an interface system to transmit data from an external system to an inside data driver. The interface system is divided into a transmitter installed in the external system and a receiver installed in a panel. The transmitter receives a data from the external system, and transmits the received data to the receiver. The receiver transmits the data, received from the transmitter, to a data driver.

Then, the data driver generates a data signal corresponding to the data supplied to the data driver itself and supplies the generated data signal to data lines inside the flat panel display.

These contemporary interface systems have, however, a disadvantage that a clock having a high frequency is required since a data is transmitted between the transmitter and the receiver by one bit.

SUMMARY OF THE INVENTION

It is therefore an object of the present invention to provide an improved interface system and an improved flat panel display applying the interface system.

It is another object of the present invention to solve the drawbacks of the prior art by providing an interface system capable of minimizing an electro magnetic interference (EMI), and a flat panel display using the same.

According to one aspect of the present invention, an interface system is provided with a serializer for receiving a first data and second data having a plurality of bits from the outside and sequentially outputting bits of the received first data and second data; a transmission circuit including a decoder for converting two bits supplied from the serializer into three bits, a driver for controlling a flow of electric currents to correspond to the three bits and a transmission resistor to which a voltage is applied to correspond to the flow of the electric currents; a reception circuit including a reception resistor for receiving a voltage supplied the transmission resistor, amplifiers for amplifying a voltage applied to both ends of the reception resistor, comparators for recovering the three bits and an encoder for recovering the two bits using the three bit by comparing the voltage supplied to the amplifiers; a deserializer for recovering the first data and the second data while sequentially storing the two bits supplied from the reception circuit; and stabilization circuits for controlling the transmission circuit.

According to another aspect of the present invention, a flat panel display is provided with a timing controller for receiving data from an external system; a data driver for generating data signals by employing the data supplied from the timing controller and supplying the generated data signals to data lines; a scan driver for sequentially supplying a scan signal to scan lines; pixels arranged in crossing points of the scan lines and the data lines and generating the light having a luminance corresponding to the data signal; and an interface system for transmitting a data between the external system and the timing controller. The interface system may be constructed with a serializer for receiving a first data and second data having a plurality of bits from the system and sequentially outputting bits of the received first data and second data; a transmission circuit including a decoder for converting two bits supplied from the serializer into three bits, a driver for controlling a flow of electric currents to correspond to the three bits and a transmission resistor to which a voltage is applied to correspond to the flow of the electric currents; a reception circuit including a reception resistor for receiving a voltage supplied the transmission resistor, amplifiers for amplifying a voltage applied to both ends of the reception resistor, comparators for recovering the three bits and an encoder for recovering the two bits using the three bit by comparing the voltage supplied to the amplifiers; a deserializer for recovering the first data and the second data while sequentially storing the two bits supplied from the reception circuit; and stabilization circuits for controlling the transmission circuit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
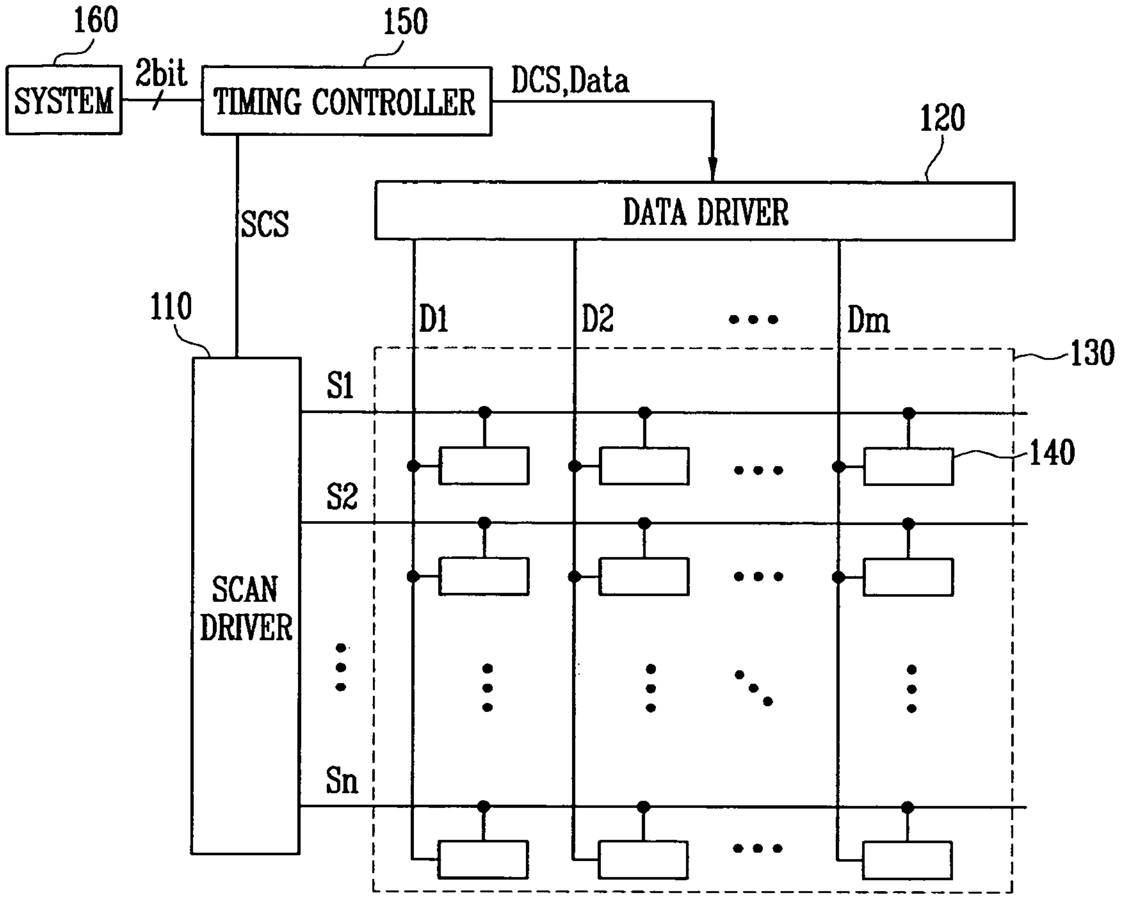
FIG. 1 is a diagram showing a flat panel display constructed as one embodiment according to the principles of the present invention.

Hereinafter, certain exemplary embodiments according to the present invention will be described with reference to the accompanying drawings. Here, when a first element is described as being coupled to a second element, the first element may be not only directly coupled to the second element but may also be indirectly coupled to the second element via a third element. Further, elements that are not essential to the complete understanding of the invention are omitted for clarity. Also, like reference numerals refer to like elements throughout.

FIG. 1 is a diagram showing a flat panel display constructed according to one embodiment of the principles of the present invention.

Referring to FIG. 1, the contemporary flat panel display is constructed with a pixel unit 130 including pixels 140 arranged in crossing points of scan lines S1 to Sn and data lines D1 to Dm, a scan driver 110 for driving scan lines S1 to Sn, a data driver 120 for driving data lines D1 to Dm, a timing controller 150 for controlling scan driver 110 and data driver 120, and a system 160 for supplying a data signal Data to timing controller 150.

Scan driver 110 receives a scan drive control signal SCS from timing controller 150. Scan driver 110 receiving scan drive control signal SCS generates a scan signal, and sequentially supplies the generated scan signal to scan lines S1 to Sn.

Data driver 120 receives a data drive control signal DCS and a data signal Data from timing controller 150. Data driver 120 receiving data drive control signal DCS generates a data signal, and supplies the generated data signal to data lines D1 to Dm to synchronize with a scan signal.

Timing controller 150 generates data drive control signal DCS and scan drive control signal SCS. Data drive control signal DCS generated in timing controller 150 is supplied to data driver 120, and scan drive control signal SCS is supplied to scan driver 110. And, timing controller 150 receives a data signal Data from system 160, and supplies received data signal Data to data driver 120.

System 160 supplies data signal Data to timing controller 150, data signal Data corresponding to an image to be displayed. Generally, data signal Data is composed of a plurality of bits. System 160 transmits data signal Data to timing controller 150 by two bits. If data signal Data is transmitted by two bit as described above, then an electro magnetic interference (EMI) may be minimized.

Pixel unit 130 includes pixels 140 arranged in crossing points of scan lines S1 to Sn and data lines D1 to Dm. When a scan signal is supplied, pixels 140 are selected to receive a data signal. Pixels 140 receiving the data signal supplies visible light having a luminance corresponding to the data signal to the outside, and therefore an image having a selected luminance is displayed in pixel unit 130.

Figure 2:
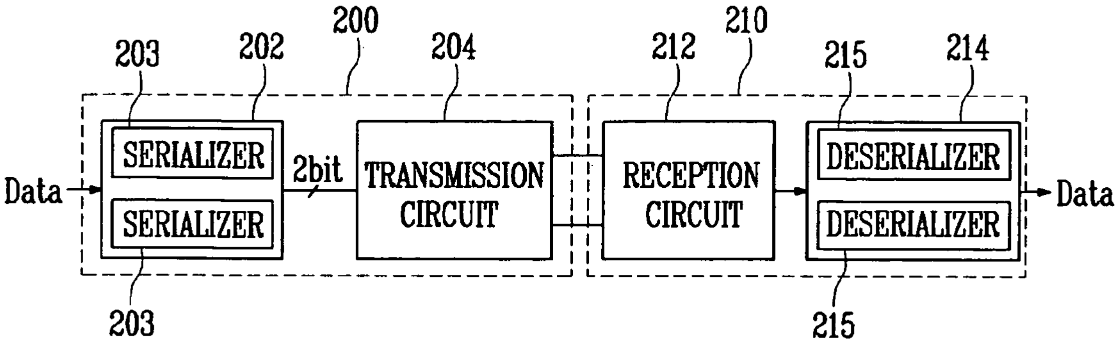
FIG. 2 is a diagram showing an interface system according to one embodiment of the principles the present invention.

FIG. 2 is a diagram showing an interface system constructed as one embodiment according to the principles of the present invention. As shown in FIG. 2, transmitter 200 is included in system 160 and receiver 210 is included in timing controller 150.

Referring to FIG. 2, the interface system according to one embodiment of the present invention includes transmitter 200 and receiver 210 for receiving an information from transmitter 200 by two bits.

Transmitter 200 includes a serializer 202 for serializing a data signal Data supplied in parallel, and a transmission circuit 204 for transmitting the 2-bit information, supplied from serializer 202, to reception circuit 212.

Figure 3:
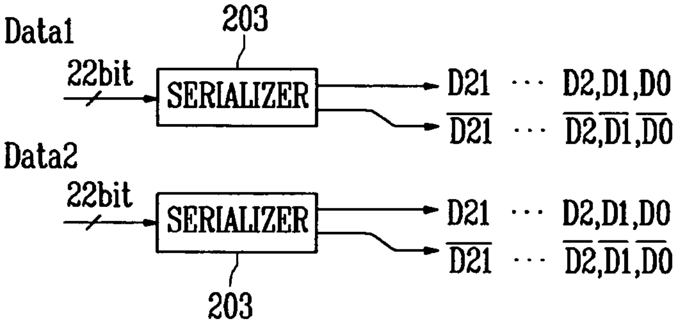
FIG. 3 is a diagram showing a serializer as shown in FIG. 2.

Serializer 202 receives two data signals Data, and converts the received two data signals Data in a series type. For this purpose, serializer 202 includes two serializers 203. Each of serializers 203 receives different data signals Data1, Data2 as shown in FIG. 3, and outputs data signals Data1, Data2 in series by sequentially outputting bits of received data Data1, Data2.

Transmission circuit 204 controls a direction of an electric current supplied to a transmission resistor (not shown) included inside transmission circuit 204 to correspond to the two bits supplied from serializer 202. If so, a voltage applied to the transmission resistor is determined to correspond to the two bits supplied from serializer 202, and a voltage in both ends of the transmission resistor is supplied to reception circuit 212. Meanwhile, the voltage applied to the transmission resistor has four voltage levels to correspond to the two bits.

Reception circuit 212 recovers an information of the two bits using a voltage applied from transmission circuit 204, and supplies the recovered 2-bit information to deserializer 214. For this purpose, a reception resistor for applying a voltage applied from the transmission resistor is provided inside reception circuit 212.

Figure 4:
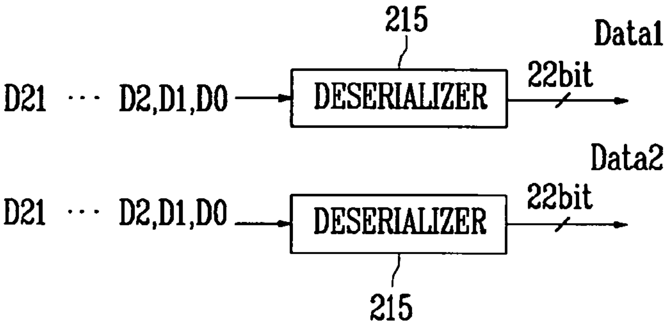
FIG. 4 is a diagram showing a deserializer as shown in FIG. 2.

Deserializer 214 recovers a data signal Data by sequentially storing the bits supplied from reception circuit 212, and outputs the recovered data signal Data in a parallel type. For this purpose, deserializer 214 includes two deserializers 215. Each of deserializers 215 receives data signal Data from reception circuit 212 by one bit (total two bits), as shown in FIG. 4, and recovers data Data1, Data2 by temporarily storing the received 1 bit. And, recovered data Data1, Data2 is supplied to data driver 120 in a parallel type.

Figure 5:
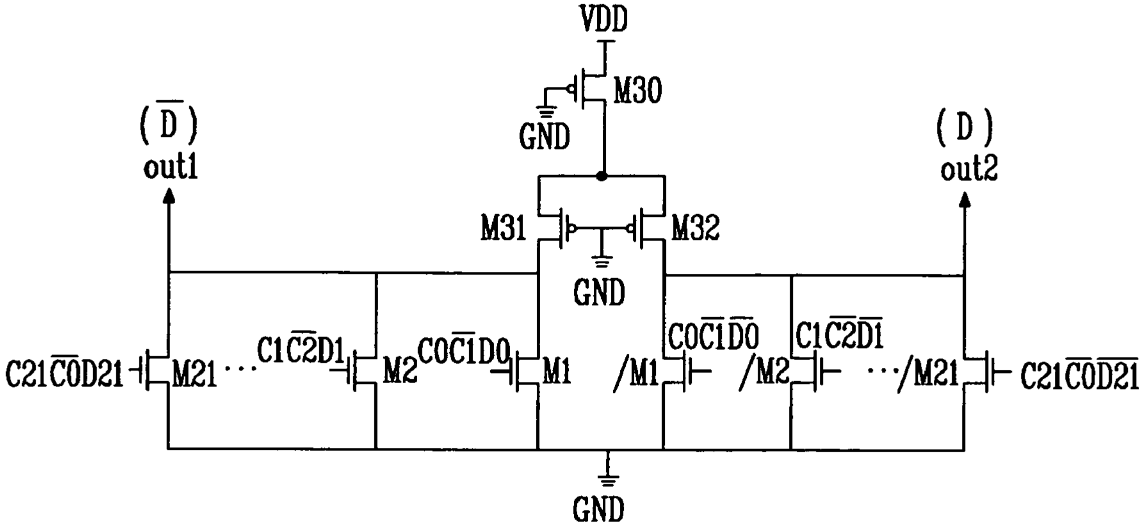
FIG. 5 is a detailed circuit view showing a serializer as shown in FIG. 2.

FIG. 5 is a circuit view showing a serializer as shown in FIG. 2.

Referring to FIG. 5, the serializer is constructed with first transistors M1, M2, . . . , M21 for receiving different bits of data signal Data, and second transistors /M1, /M2, . . . , /M21 for receiving reversed bits.

Figure 6:
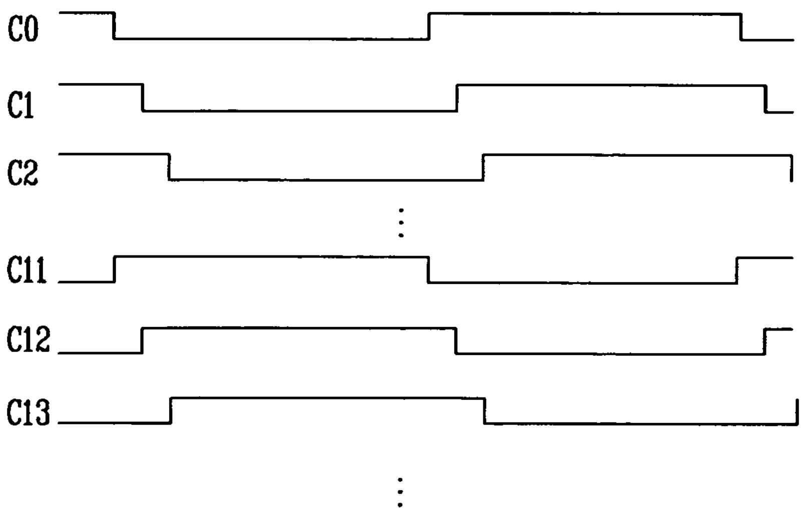
FIG. 6 is a diagram showing a driving waveform supplied to transistors as shown in FIG. 5.

First transistors M1, M2, . . . , M21 are arranged between first voltage source VDD and second voltage source VSS to receive different bits of data signal Data. For example, transistor M1 receives a D0 bit of data signal Data, and transistor M21 receives a D21 bit of data signal Data. Such first transistors M1, M2, . . . , M21 are controlled to be turned on at different time points by means of control signals C, /C. For example, control signals C, /C are supplied to transistor M1 through transistor M21, to sequentially turn on transistor M1 through transistor M21. Alternatively, control signals C, /C may be supplied to be overlapped with each other during some period, as shown in FIG. 6. Meanwhile, whether first transistors M1, M2, . . . , M21 are turned on or turned off is substantially determined by the bits of data signal Data when control signals C, /C are supplied.

Second transistors /M1, /M2, . . . , /M21 are arranged between first voltage source VDD and second voltage source VSS to receive different reversed bits of data signal Data. For example, transistor /M1 receives a /D0 bit of data signal Data, and transistor /M21 receives a /D21 bit of data signal Data. Here, the reversed bit represents a bit to which each of the bits of the data is reversed. For example, a bit value of /D0, which is a reversed bit of the D0, is set to "0" when a bit value of D0 is set to "1."

Such second transistors /M1, M2, . . . , /M21 are controlled to be turned on at different time points by means of control signals C, /C. For example, control signals C, /C is supplied to transistor /M1 through transistor /M21 to sequentially turn on transistor /M1 through transistor /M21. Here, first and second transistors M1, . . . , M21, /M1, . . . , /M21 receiving the reversed and non-reversed bits having the same weight in data signal Data are set under the same condition as to be turned on at the same time points. For example, control signals C, /C are supplied so that transistor M1 and transistor /M1 respectively receiving the non-reversed and reversed bits having the same weight can be turned on at the same time points.

An operation procedure of the serializer will be described, as follows. First, the serializer is set at a condition that transistor M1 and transistor /M1 may be turned on by means of control signals C, /C. Here, turned-on and turned-off states of transistor M1 and transistor /M1 are controlled by means of D0 bit and /D0 bit of data signal Data. For example, if the D0 bit is set to "1", then transistor M1 is turned on, and therefore a value of "0" is outputted into a first output terminal out1, and transistor /M1 is turned off and a value of "1" is outputted into a second output terminal out2. Through the operation, the data signal Data supplied in parallel is converted in a series type, and then supplied to first output terminal out1 and second output terminal out2.

Meanwhile, the serializer further includes transistor M30, transistor M31 and transistor M32. Transistor M31 is arranged between transistor M30 and first transistors M1, . . . , M21, and receives a ground power source GND into the gate electrode of transistor M31 to maintain a turned-on state. Transistor M32 is arranged between transistor M30 and second transistors /M1, . . . , /M21, and receives a ground power source GND into the gate electrode of M32 transistor M32 to maintain a turned-on state. Transistor M30 is arranged between a common node of transistor M31 and transistor M32, and a first voltage source VDD, and receives a ground power source GND into the gate electrode of transistor M30 to maintain a turned-on state.

Figure 7:
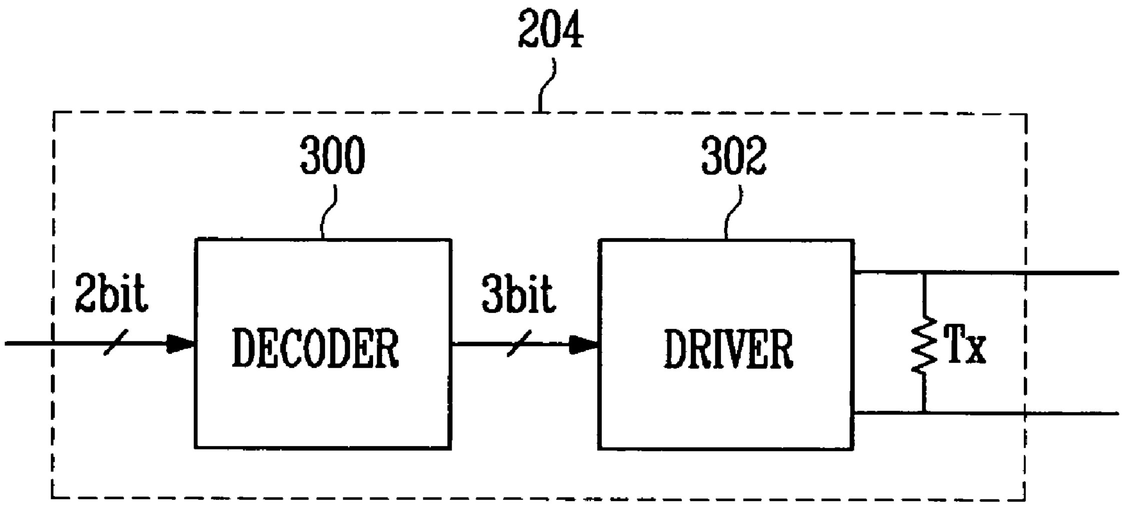
FIG. 7 is a block view showing a transmission circuit as shown in FIG. 2.

FIG. 7 is a block view showing a transmission circuit 204 as shown in FIG. 2.

Referring to FIG. 7, transmission circuit 204 according to one embodiment of the present invention is constructed with a decoder 300 for converting the two bits supplied from serializer 202 into three bits; and a driver 302 for applying a selected voltage to a transmission resistor Tx to correspond to the three bits supplied from decoder 300.

Decoder 300 converts the two bits supplied from serializer 202 into three bits. That is to say, decoder 300 converts the two bits into three bits to generate a voltage which is divided into four voltage levels in driver 302. Actually, decoder 300 converts two bits into three bits, as listed in the following Table 1.

TABLE 1

| two bits | three bits |
|---|---|
| 00 | 000 |
| 01 | 001 |
| 10 | 011 |
| 11 | 111 |

Referring to Table 1, decoder 300 generates three bits of "000" when two bit of "00" is inputted from serializer 202, and transmits the generated three bits of "000" to driver 302, and generates three bits of "001" when two bit of "01" is inputted from serializer 202 and transmits the generated three bits of "001" to driver 302. Also, decoder 300 generates three bits of "011" when two bit of "10" is inputted from serializer 202 and transmits the generated three bits of "011" to driver 302, and generates three bits of "111" when two bit of "11" is inputted from serializer 202 and transmits the generated three bits of "11" to driver 302.

Driver 302 controls a direction of an electric current supplied to transmission resistor Tx so that one of the four voltage levels can be applied to transmission resistor Tx to correspond to the 3-bit value supplied from decoder 300.

Figure 8:
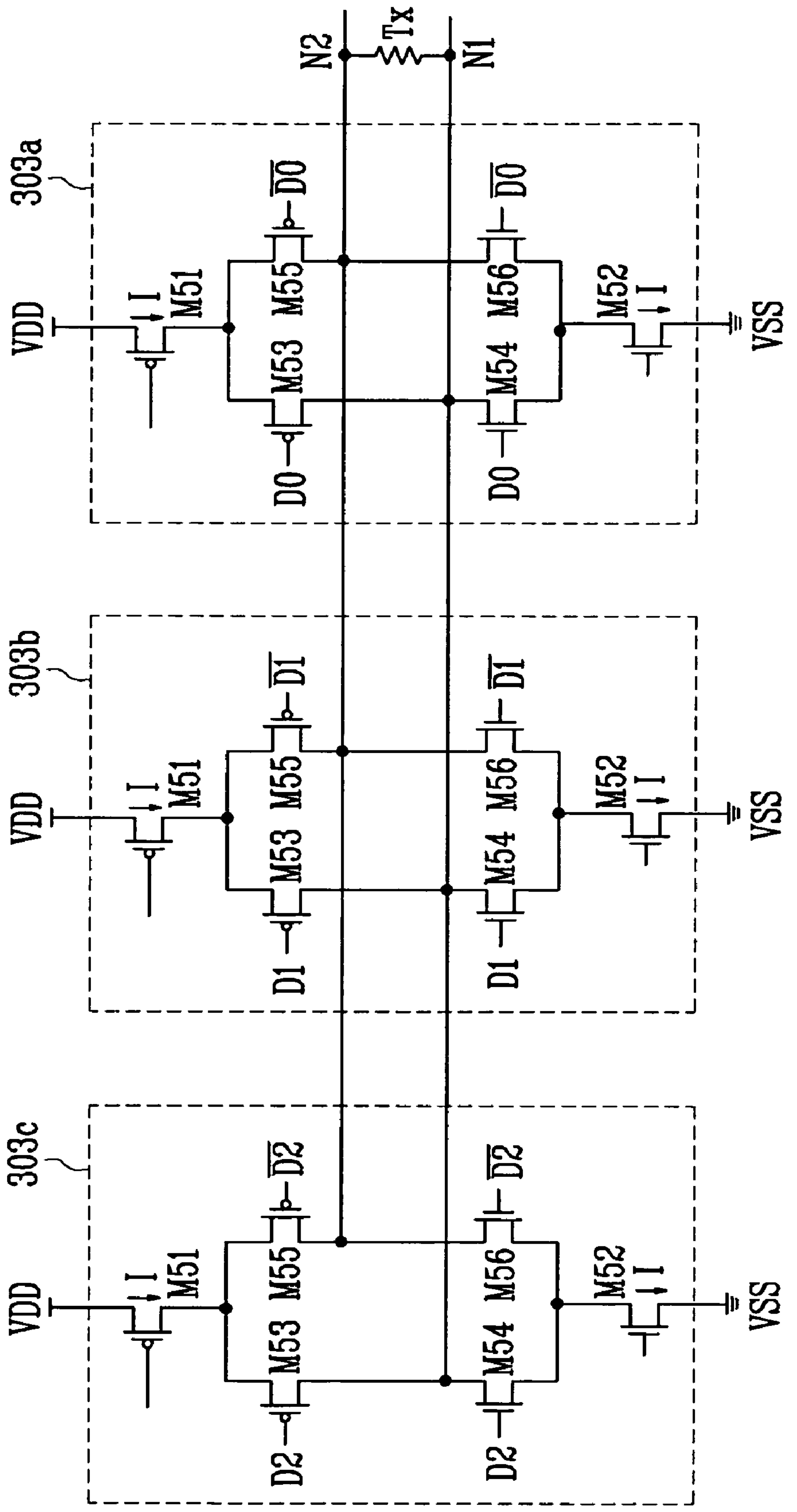
FIG. 8 is a circuit view showing drive circuits included in a driver as shown in FIG. 7.

FIG. 8 is a detailed circuit view showing a configuration of a driver as shown in FIG. 7.

Referring to FIG. 8, driver 302 according to one embodiment of the present invention is constructed with drive circuits 303*a*, 303*b*, 303*c*.

Each of drive circuits 303*a*, 303*b*, 303*c* receive one of the three bits supplied from decoder 300, and drive circuits 303*a*, 303*b*, 303*c* are driven to correspond to the received bit. For this purpose, each of drive circuits 303*a*, 303*b*, 303*c* includes a first transistor M51 coupled with a first voltage source VDD and controlling a channel width to allow a constant electric current I to flow from first voltage source VDD; a second transistor M52 coupled with a second power source VSS and controlling a channel width to allow a constant electric current I to flow; a third transistor M53 and a fourth transistor M54 arranged between first transistor M51 and second transistor M52; and a fifth transistor M55 and a sixth transistor M56 coupled in parallel with third transistor M53 and fourth transistor M54.

First transistor M51 and second transistor M52 control a constant electric current I to flow from first voltage source VDD to second power source VSS. For this purpose, a voltage value of first power source VDD is set to a higher voltage value than that of second power source VSS. And, first transistor M51 is formed in a P-type Metal Oxide Semiconductor (PMOS) type, and second transistor M52 is formed in an N-type Metal Oxide Semiconductor (NMOS) type.

Third transistor M53 and fourth transistor M54 are turned on or turned off to correspond to the certain bits D supplied to third transistor M53 and fourth transistor M54. Here, third transistor M53 is formed in a PMOS type, and fourth transistor M54 is formed in an NMOS type. Accordingly, third transistor M53 and fourth transistor M54 are turned on and turned off in an alternate manner.

Fifth transistor M54 and sixth transistor M56 are turned on or turned off to correspond to the certain reversed bits /D supplied to fifth transistor M54 and sixth transistor M56. Here, fifth transistor M55 is formed in a PMOS type, and sixth transistor M56 is formed in an NMOS type. Accordingly, fifth transistor M54 and sixth transistor M56 are turned on and turned off in an alternate manner.

Operation procedures of such drive circuits 303*a*, 303*b*, 303*c* will be described with reference to the following Table 2.

TABLE 2

| three bits | Direction of Electric Current | Applied Voltage of Transmission Resistor |
|---|---|---|
| 000 | ↑↑↑ (−6 mA) | −600 mV |
| 001 | ↑↑↓ (−2 mA) | −200 mV |
| 011 | ↑↓↓ (2 mA) | 200 mV |
| 111 | ↓↓↓ (6 mA) | 600 mV |

As listed in the Table 2, a constant electric current I is set to 2 mA for convenience's sake of descriptions. And, a voltage applied to transmission resistor Tx is set to 200 mV when an electric current of 2 mA is supplied.

Referring to Table 2, the direction of the electric current represents a direction of an electric current flowing in transmission resistor Tx to correspond to the three bits. And, the applied voltage of a transmission resistor represents a voltage value applied to transmission resistor Tx to correspond to the flow of the electric current.

If a bit of "0" is inputted into each of drive circuits 303*a*, 303*b*, 303*c*, then third transistor M53 and sixth transistor M56 transistor are turned on. If third transistor M53 and sixth transistor M56 are turned on, then the constant electric current I is supplied to sixth transistor M56 via third transistor M53, first node N1, transmission resistor Tx and second node N2. That is to say, if the bit of "0" is inputted, then a direction of an electric current flowing in transmission resistor Tx is set from a first node N1 to a second node N2 (that is to say, "↑" as listed in Table).

Also, if a bit of "1" is inputted into each of drive circuits 303*a*, 303*b*, 303*c*, then fourth transistor M54 and fifth transistor M55 are turned on. If fourth transistor M54 and fifth transistor M55 are turned on, then constant electric current I is supplied to fourth transistor M54 via fifth transistor M55, second node N2, transmission resistor Tx and first node N1. That is to say, if the bit of "1" is inputted, then a direction of an electric current flowing in transmission resistor Tx is set from a second node N2 to a first node N1 (That is to say, "↓" as listed in Table 2).

An operation procedure of the serializer will be described in detail, as follows. If three bits of "000" are inputted, then each of drive circuits 303*a*, 303*b*, 303*c* supplies an electric current from first node N1 to second node N2 via transmission resistor Tx. Accordingly, an electric current of −6 mA and a voltage of −600 mV corresponding to the electric current of −6 mA are applied to transmission resistor Tx, as listed in Table 2.

If three bits of "001" are inputted, then second and third drive circuits 303*b*, 303*c* supply an electric current from first node N1 to second node N2 via transmission resistor Tx, and first drive circuit 303*a* supplies an electric current from second node N2 to first node N1 via transmission resistor Tx. Accordingly, an electric current of −2 mA and a voltage of −200 mV corresponding to the electric current of −2 mA are applied to transmission resistor Tx, as listed in Table 2.

If three bits of "01" are inputted, then third drive circuit 303*c* supplies an electric current from first node N1 to second node N2 via transmission resistor Tx, and first and second drive circuit 303*a*, 303*b* supply an electric current from second node N2 to first node N1 via transmission resistor Tx. Accordingly, an electric current of 2 mA and a voltage of 200 mV corresponding to electric current 2 mA are applied to transmission resistor Tx, as listed in Table 2.

If three bits of "111" are inputted, then drive circuits 303*a*, 303*b*, 303*c* supply an electric current from second node N2 to first node N1 via transmission resistor Tx. Accordingly, an electric current of 6 mA and a voltage of 600 mV corresponding to the electric current of 6 mA are applied to transmission resistor Tx, as listed in Table 2.

That is to say, driver 302 according to the present invention is allowed to apply four voltage levels to transmission resistor Tx to correspond to the three bits supplied from the decoder 300, and supplies the voltage, which is applied to transmission resistor Tx, to reception circuit 212. Here, a voltage of transmission resistor Tx is supplied to reception circuit 212 by means of two transmission and reception lines arranged between transmission circuit 204 and reception circuit 212.

Figure 9:
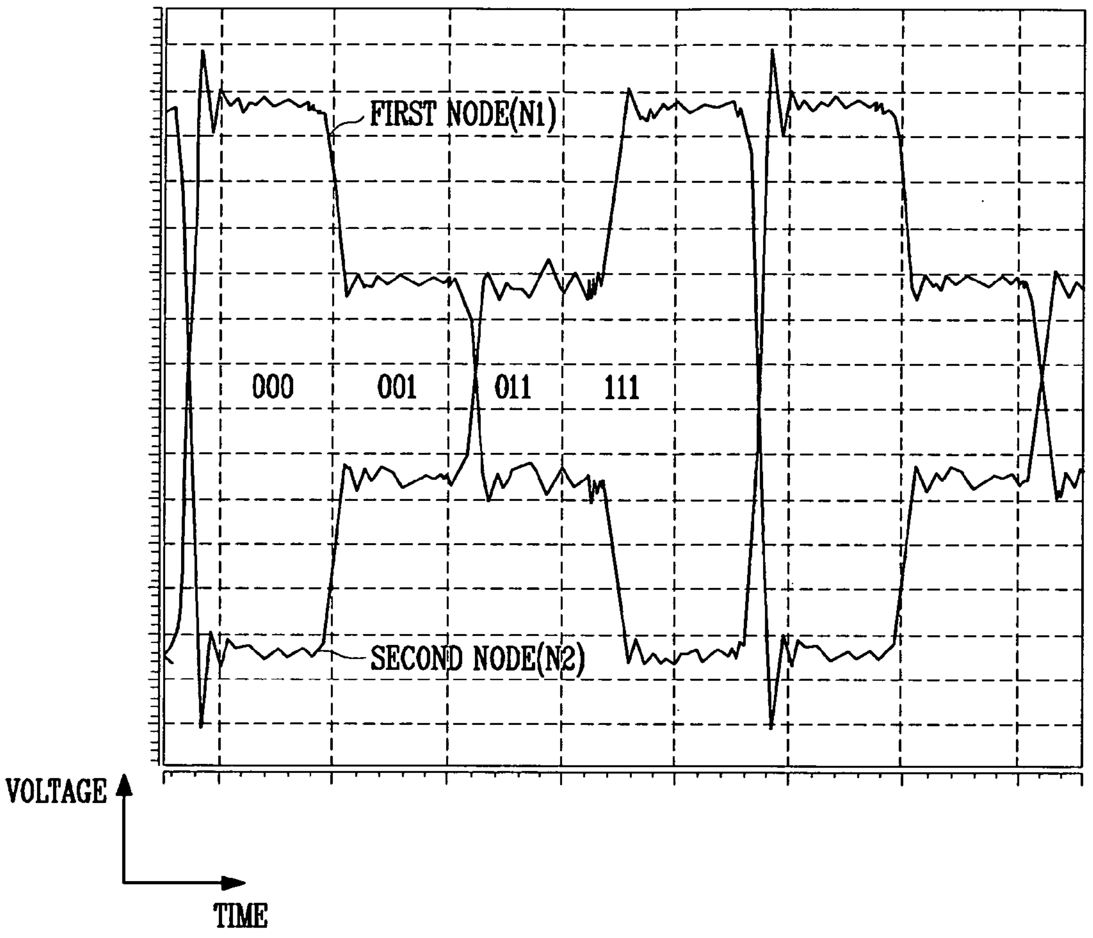
FIG. 9 is a simulation waveform view showing a voltage applied to transmission resistor as shown in FIG. 8.

FIG. 9 is a simulation diagram showing a voltage applied to first node N1 and second node N2 to correspond to a direction of an electric current.

Referring to FIG. 9, the voltage applied to first node N1 and second node N2 of transmission resistor Tx is set to have four voltage levels to correspond to the three bits supplied from decoder 300. Here, a 2-bit information of data signal Data is included in the voltage information applied to transmission resistor Tx since the three bits supplied from decoder 300 are generated by the 2-bit information of data signal Data.

Figure 10:
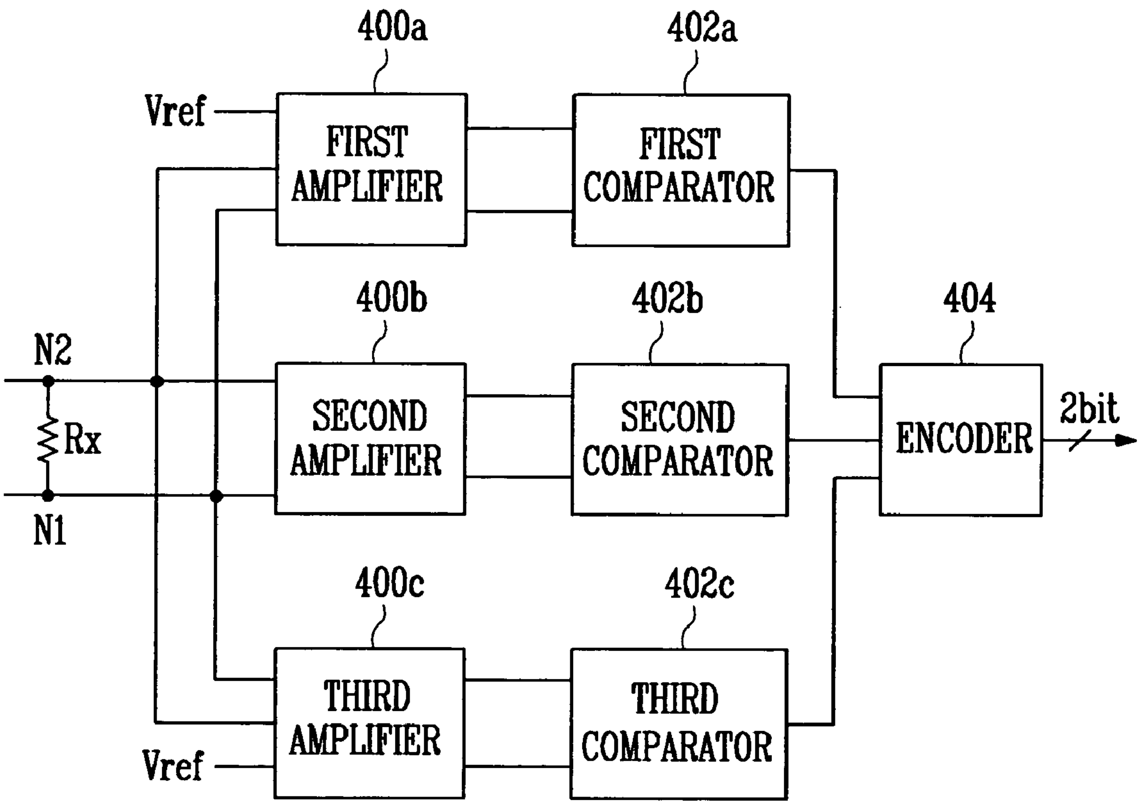
FIG. 10 is a diagram showing a reception circuit as shown in FIG. 2.

FIG. 10 is a diagram showing a reception circuit as shown in FIG. 2.

Referring to FIG. 10, reception circuit 212 according to one embodiment of the present invention is constructed with a reception resistor Rx coupled between the transmission and reception lines; amplifiers 400*a*, 400*b*, 400*c* for amplifying a voltage applied across reception resistor Rx; comparator 402*a*, 402*b*, 402*c* coupled to each of amplifiers 400*a*, 400*b*, 400*c*; and an encoder 404 for recovering two bits of data signal Data using bits supplied from comparators 402*a*, 402*b*, 402*c*.

A voltage applied to transmission resistor Tx is applied to reception resistor Rx, as shown in FIG. 9. Such a reception resistor Rx is used to match the impedance with transmission resistor Tx.

First amplifier 400*a* amplifies a voltage of first node N1 of reception resistor Rx to a relatively higher level than that of second node N2.

Second amplifier 400*b* amplifies voltages of first node N1 and second node N2 of reception resistor Rx to the same level.

Third amplifier 400*c* amplifies a voltage of second node N2 of reception resistor Rx to a relatively higher level than that of first node N1.

First comparator 402*a* generates a bit of "1" or "0" using a voltage supplied from first amplifier 400*a*, and supplies the generated bit to encoder 404. Here, first comparator 402*a* generates a bit of "0" when a voltage of first node N1 is higher than a voltage of second node N2, and generates a bit of "1" otherwise.

Second comparator 402*b* generates a bit of "1" or "0" using a voltage supplied from second amplifier 400*b*, and supplies the generated bit to encoder 404. Here, second comparator 420*a* generates a bit of "0" when a voltage of first node N1 is higher than a voltage of second node N2, and generates a bit of "1" otherwise.

Third comparator 402*c* generates a bit of "1" or "0" using a voltage supplied from third amplifier 400*c*, and supplies the generated bit to encoder 404. Here, third comparator 420*c* generates a bit of "0" when a voltage of first node N1 is higher than a voltage of second node N2, and generates a bit of "1" otherwise.

Encoder 404 generates two bits using three bits supplied from comparators 402*a*, 402*b*, 402*c*. Here, encoder 404 converts three bits into two bits, as listed in Table 1. That is to say, encoder 404 generates two bits of "00" when three bits of "000" is inputted, and generates two bits of "01" when three bits of "001" is inputted. And, encoder 404 generates two bits of "10" when three bits of "011" is inputted, and generates two bits of "11" when three bits of "111" is inputted.

Figure 11:
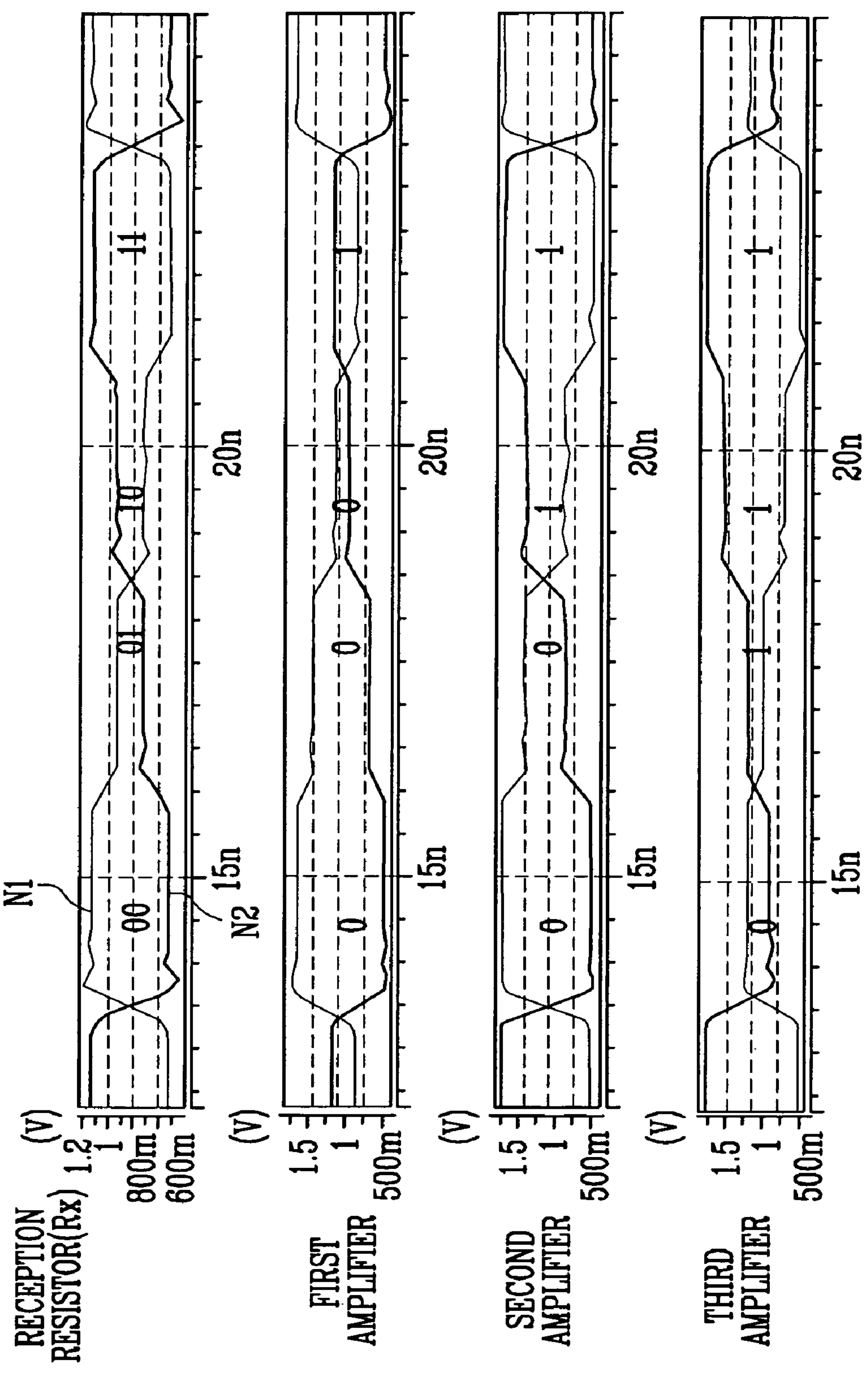
FIG. 11 is a simulation waveform view showing an operating process of the reception circuit as shown in FIG. 10.

FIG. 11 is a simulation waveform view showing an operation procedure of a reception circuit according to the present invention.

Referring to FIG. 11, first, a selected voltage corresponding to the two bits of data signal Data is applied to reception resistor Rx. Here, assume that a voltage value corresponding to bits of "11", "10", "01" and "00" is sequentially inputted into reception resistor Rx for convenience' sake of descriptions.

Amplifiers 400*a*, 400*b*, 400*c* amplify a voltage value supplied to reception resistor Rx and supplied the amplified voltage value to comparators 402*a*, 402*b*, 402*c*. Here, first amplifier 400*a* amplifies a voltage of first node N1 to a relatively higher level than that of second node N2. Actually, first amplifier 400*a* amplifies a voltage of first node N1 so that the voltage of first node N1 can be higher than that of second node N2 if a voltage corresponding to the bits of "10" is applied to reception resistor Rx.

And, third amplifier 400*c* amplifies a voltage of first node N1 to a relatively higher level than that of first node N1. Actually, third amplifier 400*c* amplifies a voltage of second node N2 to a relatively higher level than that of first node N1. Actually, first amplifier 400*a* amplifies a voltage of second node N2 so that the voltage of second node N2 can be higher than that of first node N1 if a voltage corresponding to the bits of "01" is applied to reception resistor Rx.

Comparators 402*a*, 402*b*, 402*c* generates bits of "1" or "0" using a voltage supplied from amplifiers 402*a*, 402*b*, 402*c*. Actually, comparators 402*a*, 402*b*, 402*c* generates bits of "0" when the voltage of first node N1 is higher than that of second node N2, and generates bits of "1" in the other case.

Then, if the voltage corresponding to the bits of "11" is applied to reception resistor Rx, then the bits of "111" are generated and supplied to encoder 404, and the bits of "011" are generated and supplied to encoder 404 if the voltage corresponding to the bits of "10" is applied. Also, if the bits of "01" are applied to reception resistor Rx, then the bits of "011" are generated and supplied to encoder 404, and the bits of "000" are generated and supplied to encoder 404 if the voltage corresponding to the bits of "00" is applied.

Encoder 404 generates two bits to correspond to three bits supplied to encoder 404 itself, as listed in the Table 1. That is to say, in the present invention, a 2-bit information is transmitted between transmission circuit 204 and reception circuit 212 per one cycle, and the information is stably recovered in encoder 404.

Figure 12:
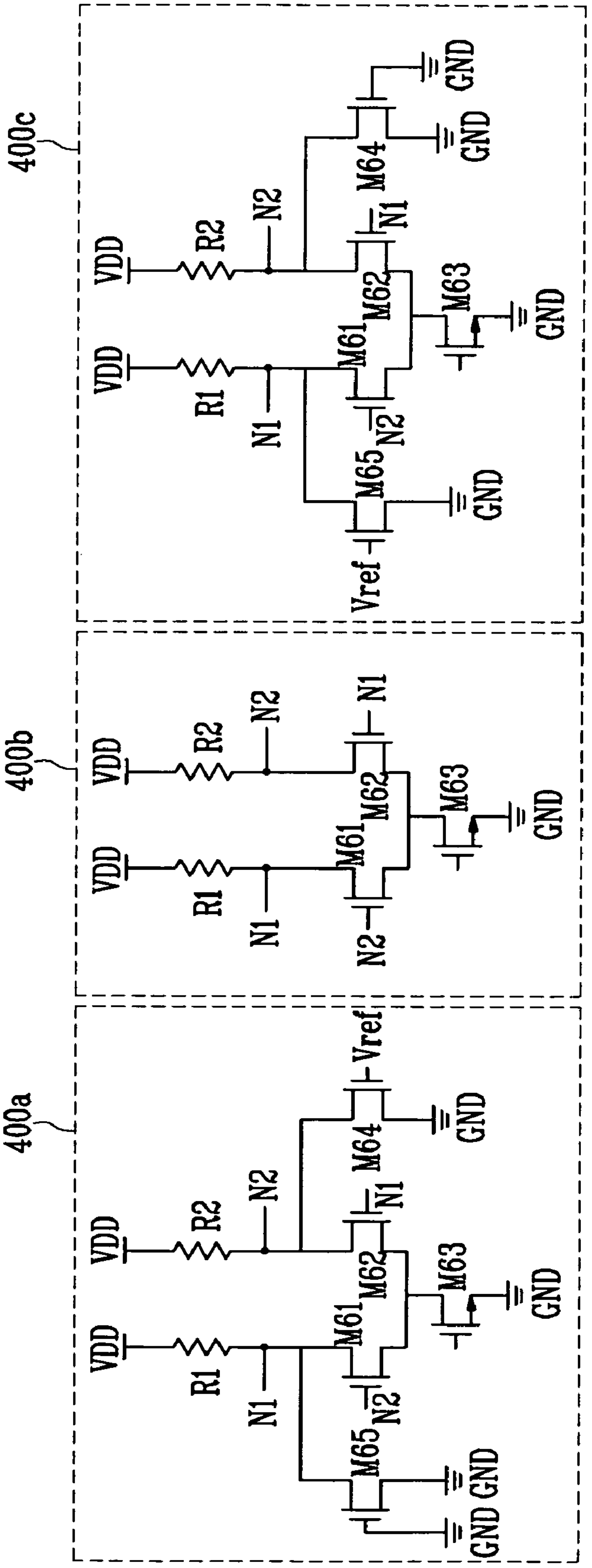
FIG. 12 is a circuit view showing amplifiers as shown in FIG. 10.

FIG. 12 is a schematic diagram showing amplifiers as shown in FIG. 10.

Referring to FIG. 12, each of amplifiers 400*a*, 400*b*, 400*c* according to one embodiment of the present invention is constructed with a first resistor R1 and a first transistor M61 coupled between a first voltage source VDD and a ground power source GND; a second resistor R2 and a second transistor M62 coupled in parallel with first resistor R1 and first transistor M61; and a third transistor M63 coupled between common nodes of first transistor M61 and second transistor M62 and ground power source GND.

A gate electrode of first transistor M61 receives a voltage applied to second node N2 of reception resistor Rx. A gate electrode of second transistor M62 receives a voltage applied to first node N1 of reception resistor Rx. Third transistor M63 controls a selected electric current to correspond to a voltage supplied from the outside.

An operation procedure will be described with reference to second amplifier 400*b* shown in FIG. 12. First transistor M61 and second transistor M62 supply an electric current flowing in third transistor M63 by means of the voltage supplied to first transistor M61 and second transistor M62.

At this time, each of first transistor M61 and second transistor M62 limits a channel width to correspond to a voltage applied to the respective gate electrode, that is, each of first transistor M61 and second transistor M62 is driven by a selected resistivity. In this case, the voltage applied between first transistor M61 and first resistor R1 is outputted into the amplified voltage of first node N1, and the voltage applied between second transistor M62 and second resistor R2 is outputted into the amplified voltage of second node N2.

Meanwhile, first amplifier 400*a* and third amplifier 400*c* further includes a fifth transistor M65 coupled between common terminals of first resistor R1 and first transistor M61 and ground power source GND; and a fourth transistor M64 coupled between common terminals of second resistor R2 and second transistor M62 and ground power source GND.

Fifth transistor M65 included in first amplifier 400*a* always maintains a turned-off state. Fifth transistor M65 may be omitted as a dummy transistor. Fourth transistor M64 included in first amplifier 400*a* is turned on to allow a selected electric current to flow by means of a reference voltage Vref supplied from the outside. If such a fourth transistor M64 is turned on to allow the selected electric current to flow, then first amplifier 400*a* amplifies a voltage of first node N1 to a relatively higher level than that of second node N2.

Fourth transistor M64 included in third amplifier 400*c* always maintains a turned-off state. Fourth transistor M64 may be omitted as a dummy transistor. fifth transistor M65 included in third amplifier 400*c* is turned on to allow a selected electric current to flow by means of a reference voltage Vref supplied from the outside. If fifth transistor M65 is turned on to allow the selected electric current to flow, then third amplifier 400*c* amplifies a voltage of second node N2 to a relatively higher level than that of first node N1.

Figure 13:
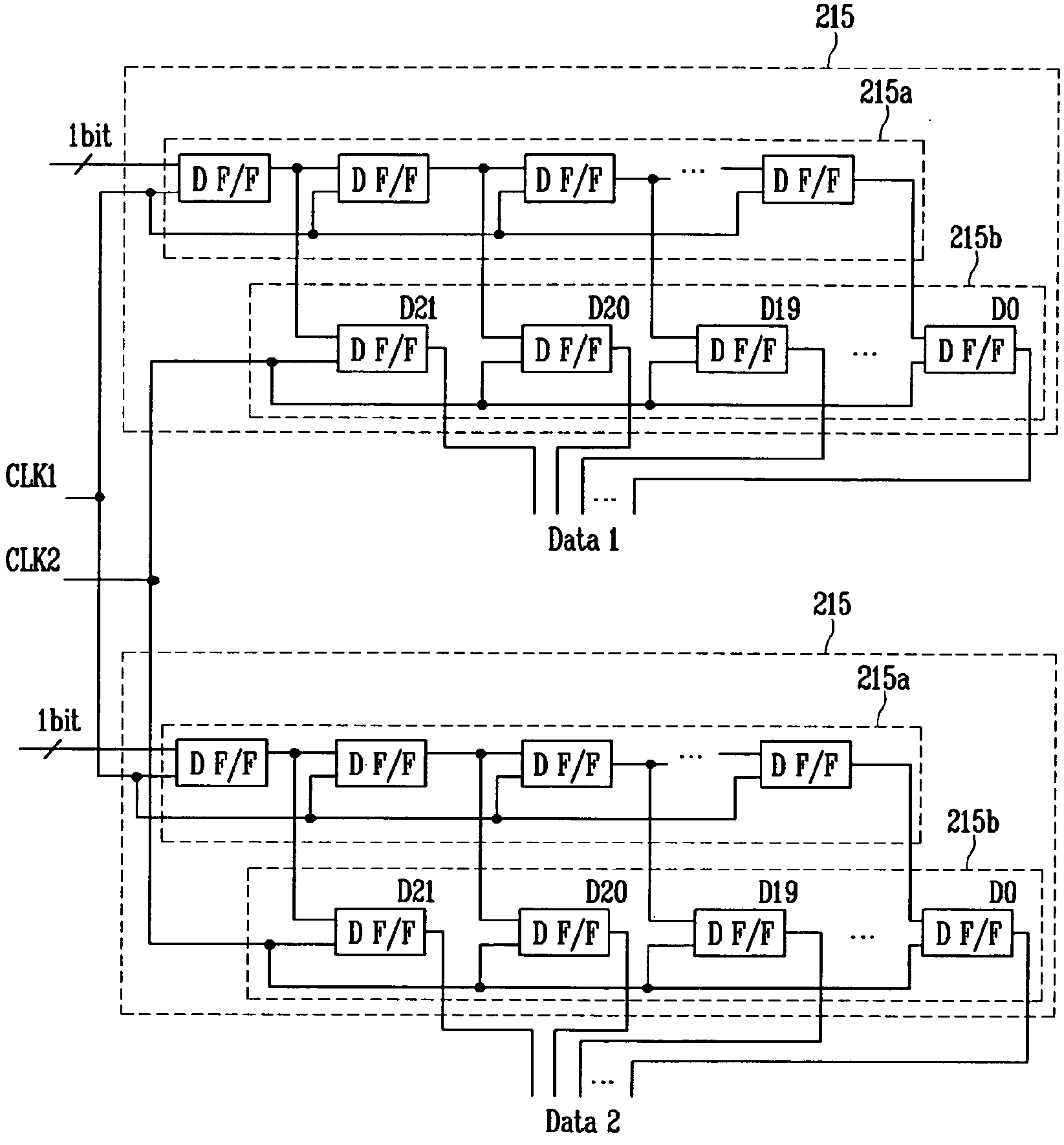
FIG. 13 is a diagram showing a deserializer as shown in FIG. 10.

FIG. 13 is a diagram showing a deserializer as shown in FIG. 2.

Referring to FIG. 13, the deserializer according to the present invention includes two deserializers 215.

Each of deserializers 215 includes first flip flop circuit 215*a* for sequentially assigning 1 bit supplied from encoder 404, and second flip flop circuit 215*b* for receiving a data stored in first flip flop circuit 215*a* and outputting the received data at the same time.

Each of deserializers 215 receives different bits among the two bits supplied from encoder 404. Here, the 1 bit supplied from encoder 404 is sequentially stored in first flip flop circuits 215*a*. For this purpose, first flip flop circuits 215*a* are composed of k number of D flip flops to correspond to the k-bit (k is an integer).

Second flip flop circuit 215*b* stores all of the bits of the data signal Data in first flip flop circuit 215*a*, and then receives bits stored in first flip flop circuit 215*a* and outputs the received bits as data signal Data as the same time. For this purpose, second flip flops 215*b* are composed of k number of D flip flops. Meanwhile, second clock signal CLK2 supplied to second flip flop circuit 215*b* is set to have a wider width than first clock signal CLK1 supplied to first flip flop circuit 215*a*.

In the above-mentioned interface according to the present invention, a frequency of a clock may be advantageously lowered since a 2-bit information is transmitted between transmission circuit 204 and reception circuit 212 in every cycle. That is to say, the contemporary interface requires a high clock so as to transmit a 1-bit information in every cycle, but the interface according to the present invention may lower a frequency of a clock that is lower than that of the contemporary interface, thereby to minimize an electro magnetic interference, since the 2-bit information is transmitted in every cycle.

Meanwhile, in the present invention, a phase locked loop (PLL) may be additionally installed in transmitter 200, and a clock data recovery (CDR) may be additionally installed in receiver 210. The PLL receives a reference clock (not shown), and supplies a clock to serializer 202 using the received reference clock. The CDR receives a reference clock and supplies a clock to deserializer 214 using the received reference clock.

Figure 14:
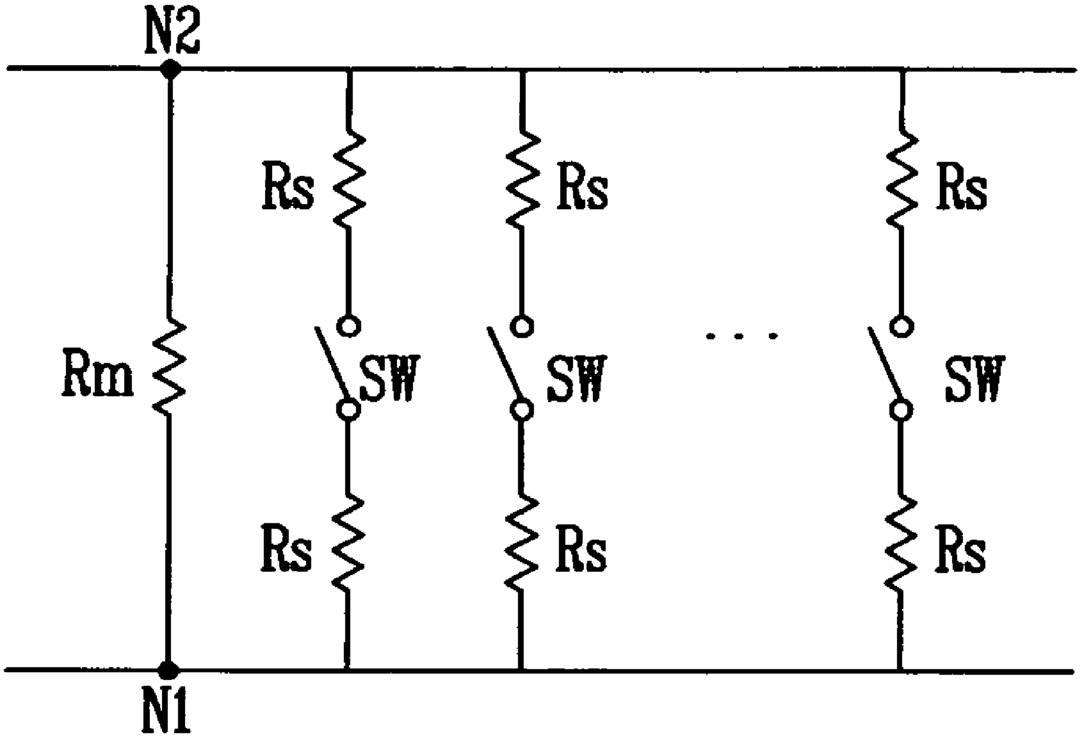
FIG. 14 is a diagram showing a transmission resistor and/or a reception resistor according to one embodiment of the present invention.

FIG. 14 is a diagram showing a transmission resistor and/or a reception resistor according to one embodiment of the present invention.

Referring to FIG. 14, at least one of the transmission resistor and the reception resistor according to one embodiment of the present invention includes a main resistor Rm arranged between first node N1 and second node N2 of the transmission and reception line, auxiliary resistors Rs arranged between first node N1 and second node N2, and a switch SW arranged to be coupled to each of auxiliary resistors Rs to electrically connect the transmission and reception lines with auxiliary resistor Rs.

In the present invention, the 2-bit information is transmitted using four voltage levels applied to the transmission resistor and the reception resistor, as described above. Accordingly, in order to exactly transmit the 2-bit information, the transmission resistor and the reception resistor should be set to a resistance value of a desired design value. It is generally difficult, however, to exactly design the transmission resistor and the reception resistor with the resistance value of the desired design value due to the deviation in process.

Accordingly, in the present invention, auxiliary resistors Rs and switches SW coupled with auxiliary resistors Rs are used to adjust a resistance value between first node N1 and second node N2 to a desired value. That is to say, at least one resistor of the transmission resistor and the reception resistor is adjusted to a resistance value of the desired design value by controlling turned-on and turned-off states of switches SW.

Meanwhile, in the present invention, drive circuits 303*a*, 303*b*, 303*c* should stably supply a desired electric current to transmission resistor Tx. That is to say, if an unnecessary electric current is supplied from the drive circuits 303*a*, 303*b*, 303*c* to transmission resistor Tx, then the interface system according to the present invention may be driven unstably. Accordingly, in the present invention, a stabilization circuit is additionally installed in each of drive circuits 303*a*, 303*b*, 303*c* so that drive circuits 303*a*, 303*b*, 303*c* can be driven stably.

Figure 15:
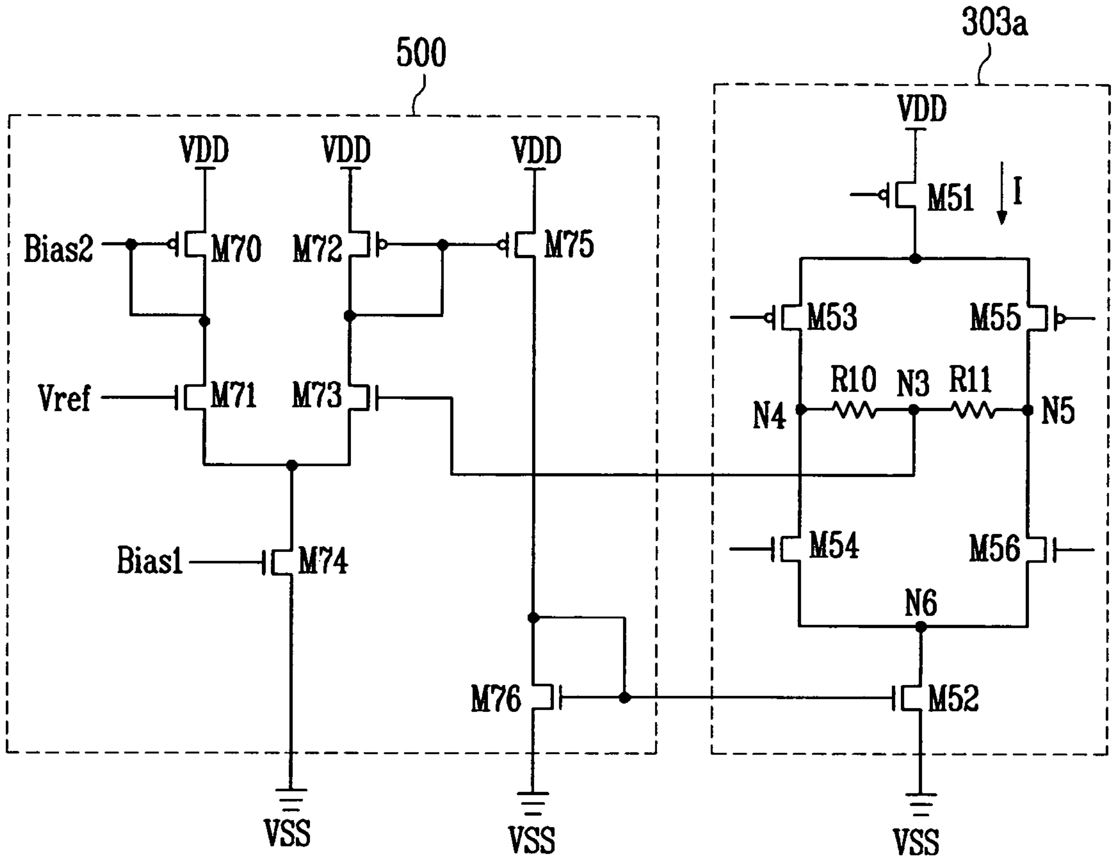
FIG. 15 is a diagram showing a stabilization circuit according to one embodiment of the present invention.

FIG. 15 is a circuit view showing a stabilization circuit according to one embodiment of the present invention. A stabilization circuit coupled with first drive circuit 303*a* is shown in FIG. 15 for convenience' sake of descriptions. As shown in FIG. 15, a first voltage VDD is set to a higher voltage value than second voltage VSS. For example, second voltage VSS may be set to a ground power source GND. And, the seventh, ninth and twelfth transistors M70, M72, M75 are formed in a PMOS type and other transistors M71, M73, M74, M76 are formed in an NMOS type in stabilization circuit.

Referring to FIG. 15, stabilization circuit 500 according to one embodiment of the present invention includes a seventh transistor M70 and an eighth transistor M71 arranged between first voltage source VDD and second voltage source VSS; a ninth transistor M72 and a tenth transistor M73 coupled in parallel with seventh transistor M70 and eighth transistor M71; an eleventh transistor M74 arranged between a common terminal of eighth transistor M71 and tenth transistor M73, and a second voltage source VSS; a twelfth transistor M75 coupled with ninth transistor M72 in a current mirror type; and a thirteenth transistor M76 coupled between twelfth transistor M75 and second power source VSS.

A first electrode of seventh transistor M70 is coupled with first voltage source VDD and a second electrode is coupled to the gate electrode of seventh transistor M70 and a second electrode of eighth transistor M71. And, a gate electrode of seventh transistor M70 receives a second bias Bias2 voltage. Here, second bias Bias2 voltage may be removed since seventh transistor M70 is coupled in a diode type.

Meanwhile, a first electrode is set to one of a source electrode and a drain electrode, and the second electrode is set to an electrode different from the first electrode. For example, if the first electrode is set to a source electrode, then the second electrode is set to a drain electrode.

The second electrode of eighth transistor M71 is coupled to the second electrode of seventh transistor M70, and a first electrode of eighth transistor M71 is coupled to a second electrode of eleventh transistor M74. And, a gate electrode of eighth transistor M71 receives a reference power source Vref. Such an eighth transistor M71 supplies an electric current corresponding to reference voltage Vref to eleventh transistor M74.

A first electrode of ninth transistor M72 is coupled with first voltage source VDD and a second electrode of ninth transistor M72 is coupled to the gate electrode of ninth transistor M72 and a second electrode of tenth transistor M73. And, a gate electrode of ninth transistor M72 is coupled to a gate electrode of twelfth transistor M75. That is to say, ninth transistor M72 is coupled in a diode type, and simultaneously coupled with twelfth transistor M75 in a current mirror type.

The second electrode of tenth transistor M73 is coupled to the second electrode of ninth transistor M72, and a first electrode of tenth transistor M73 is coupled to the second electrode of the eleventh transistor M74. And, the gate electrode of tenth transistor M73 is coupled to drive circuit 303*a*. Such a tenth transistor M73 controls an electric current capacity to correspond to the voltage supplied from drive circuit 303*a*, and the electric current capacity flowing from ninth transistor M72 to eleventh transistor M74.

The second electrode of eleventh transistor M74 is coupled to first electrodes of eighth and tenth transistors M71, M73, and a first electrode of eleventh transistor M74 is coupled to second voltage source VSS. And, gate electrode of eleventh transistor M74 receives a first bias Bias1. Such an eleventh transistor M74 controls an electric current capacity to correspond to first bias Bias1 voltage, and the electric current capacity flowing into second voltage source VSS.

A first electrode of twelfth transistor M75 is coupled to first voltage source VDD, and a second electrode of twelfth transistor M75 is coupled to a second electrode and a gate electrode of thirteenth transistor M76. And, a gate electrode of twelfth transistor M75 is coupled with the gate electrode of ninth transistor M72. Such a twelfth transistor M75 is coupled with ninth transistor M72 in a current mirror type. Accordingly, twelfth transistor M75 supplies an electric current to thirteenth transistor M76, and the electric current corresponding to the electric current capacity flowing from ninth transistor M72.

A second electrode and a gate electrode of thirteenth transistor M76 are coupled to the second electrode of twelfth transistor M75, and a first electrode is coupled to second voltage source VSS. And, the gate electrode of thirteenth transistor M76 is coupled with the gate electrode of second transistor M52. Such a thirteenth transistor M76 is coupled in a diode type to supply an electric current, supplied from twelfth transistor M75, to second electrode VSS.

Meanwhile, in the case of drive circuit 303*a*, a tenth resistor R10 and an eleventh resistor R11 are installed between fourth node N4 and fifth node N5, wherein fourth node N4 is arranged between third transistor M53 and fourth transistor M54, and fifth node N5 is arranged between fifth transistor M55 and sixth transistor M56. And, third node N3 between tenth resistor R10 and eleventh resistor R11 is coupled with the gate electrode of tenth transistor M73. Here, tenth resistor R10 and eleventh resistor R11 are set to the same resistance value.

An operation procedure will be described in detail, as follows. First, a voltage applied to third node N3 increases or decreases from a voltage having a design value when drive circuit 303*a* is driven abnormally.

For example, if the voltage of third node N3 decreases to a lower level than that of the design value, then an electric current flowing from tenth transistor M73 is lowered. If the electric current flowing from tenth transistor M73 is lowered, then an electric current flowing from twelfth transistor M75 is lowered, with twelfth transistor M75 being coupled to ninth transistor M72 and ninth transistor M72 in a current mirror type. Accordingly, an electric current capacity flowing in thirteenth transistor M76 is also lowered, with thirteenth transistor M76 receiving an electric current from twelfth transistor M75.

If the electric current capacity flowing in thirteenth transistor M76 is lowered, then a voltage between the first electrode (the source electrode) and the gate electrode of thirteenth transistor M76 is also lowered. If so, a voltage between the first electrode and the gate electrode of second transistor M52 is also lowered, and therefore a voltage of sixth node N6 is increased.

If the voltage of sixth node N6 is increased, then a voltage between the first electrode and the gate electrode of fourth transistor M54 is also lowered. If so, a voltage of fourth node N4 is increased. If the voltage of fourth node N4 is increased as described above, then a voltage of third node N3 is increased. That is to say, stabilization circuit 500 increases a voltage of third node N3 to stably drive drive circuit 303*a* if the voltage of third node N3 is decreased.

Meanwhile, if the voltage of third node N3 is increased to a higher level than that of the design value, then an electric current flowing in tenth transistor M73 is increased. If the electric current flowing in tenth transistor M73 is increased, then an electric current flowing in ninth transistor M72 and twelfth transistor M75 is increased. Accordingly, an electric current capacity flowing in thirteenth transistor M76 is also increased, thirteenth transistor M76 receiving an electric current from twelfth transistor M75.

If the electric current capacity flowing in thirteenth transistor M76 is also increased, then a voltage between the first electrode and the gate electrode of thirteenth transistor M76 is increased. If the voltage between the first electrode and the gate electrode of thirteenth transistor M76 is increased, then a voltage of sixth node N6 is decreased.

If the voltage of sixth node N6 is decreased, then a voltage between the first electrode and the gate electrode of fourth transistor M54 is increased. If so, a voltage of fourth node N4 is decreased. If the voltage of such a fourth node N4 is decreased, then a voltage of third node N3 is decreased. That is to say, stabilization circuit 500 decreases a voltage of third node N3 to stably drive drive circuit 303*a* if the voltage of third node N3 is increased.

As described above, the interface system according to one embodiment of the present invention and the flat panel display using the same can be useful to transmit information corresponding to the two bits per one cycle between the transmission circuit arranged in the external system and the reception circuit arranged in the panel. If the information corresponding to the two bits is transmitted per one cycle as described above, a clock frequency is lowered, and therefore an electro magnetic interference may be minimized. Also, the interface system according to one embodiment of the present invention can be useful to stably drive the transmission circuit since the transmission circuit includes a stabilization circuit.

Although exemplary embodiments of the present invention have been shown and described, it would be appreciated by those skilled in the art that changes might be made in these embodiments without departing from the principles and spirit of the invention, the scope of which is defined in the claims and their equivalents.

What is claimed is:

1. An interface system, comprising:
- a serializer for receiving a first data and second data having a plurality of bits from an external device, and sequentially outputting of the received first data and second data in two bits;
- a transmission circuit coupled to the serializer, comprising:
  - a decoder for converting the two bits supplied from the serializer into three bits;
  - a driver for controlling a flow of electric current to correspond to the three bits; and
  - a transmission resistor to which a voltage is applied to correspond to the flow of the electric current;
- a reception circuit coupled to the transmission circuit, comprising:
  - a reception resistor for receiving a voltage supplied the transmission resistor;
  - amplifiers for amplifying a voltage applied to both ends of the reception resistor;
  - comparators for recovering the three bits by comparing the voltage supplied to the amplifiers; and
  - an encoder for recovering the two bits using the three bits;
- a deserializer for recovering the first data and the second data while sequentially storing the two bits supplied from the reception circuit; and
- stabilization circuits for controlling the transmission circuit.

2. The interface system according to claim 1, comprised of the driver comprising three drive circuits for receiving different bits out of the three bits and controlling a flow of an electric current supplied to the transmission resistor to correspond to the received bits.

3. The interface system according to claim 2, comprised of each of the drive circuits comprising:
- a first transistor coupled with a first voltage source and controlling a channel width to allow a constant electric current to flow from the first voltage source;
- a second transistor coupled with a second voltage source;
- a third transistor and a fourth transistor arranged between the first transistor and the second transistor; and
- a fifth transistor and a sixth transistor coupled in parallel with the third transistor and the fourth transistor.

4. The interface system according to claim 3, comprised of the first voltage being set to a higher voltage value than the second voltage.

5. The interface system according to claim 3, comprised of:
- the third transistor and the fourth transistor being controlled to be turned on and turned off by certain bits out of the three bits, and
- the fifth transistor and the sixth transistor being controlled to be turned on and turned off by reversed bits of the certain bits.

6. The interface system according to claim 5, comprised of the third transistor and the fifth transistor being formed in a PMOS type, and the fourth transistor and the sixth transistor being formed in an NMOS type.

7. The interface system according to claim 3, comprising:

a first node arranged between the third transistor and the fourth transistor;

a second node arranged between the fifth transistor and the sixth transistor; and a first resistor and a second resistor arranged between the first node and the second node.

8. The interface system according to claim 7, comprised of the first resistor and the second resistor being set to the same resistance value.

9. The interface system according to claim 7, comprised of the stabilization circuits being installed in each of the drive circuits, and each of the stabilization circuits controlling voltages of a gate electrode and a source electrode of the second transistor in the corresponding drive circuit to correspond to a voltage value applied to a third node arranged between the first resistor and the second resistor.

10. The interface system according to claim 9, comprised of each of the stabilization circuits comprising:

an eleventh transistor coupled with the second voltage source;

a seventh transistor and an eighth transistor arranged between the first voltage source and the eleventh transistor;

a ninth transistor and a tenth transistor coupled in parallel with the seventh transistor and the eighth transistor;

a twelfth transistor coupled with the second voltage source and coupled with the ninth transistor by means of a current mirror; and a thirteenth transistor coupled between the twelfth transistor and the second voltage source and having a gate electrode coupled with a gate electrode of the second transistor of the corresponding drive circuit.

11. The interface system according to claim 10, comprised of:

the eleventh transistor setting a channel width to allow an electric current to flow, with the electric current corresponding to a first bias voltage supplied from the external device; and the eighth transistor controlling an electric current supplied to the eleventh transistor to correspond to a reference voltage supplied from the external device.

12. The interface system according to claim 11, comprised of:

a gate electrode of the tenth transistor being coupled to the third node of the corresponding drive circuit; and the tenth transistor controlling an electric current supplied to the eleventh transistor to correspond to the voltage supplied from the third node of the corresponding drive circuit.

13. The interface system according to claim 12, comprised of the thirteenth transistor being coupled in a diode type to supply an electric current, which is supplied from the twelfth transistor, to the second voltage source.

14. The interface system according to claim 10, comprised of the seventh transistor, the ninth transistor and the twelfth transistor being formed in a PMOS type, and the eighth transistor, the tenth transistor, the eleventh transistor and the thirteenth transistor being formed in an NMOS type.

15. A flat panel display, comprising:

a timing controller for receiving data from an external system;

a data driver for generating data signals by employing the data supplied from the timing controller and supplying the generated data signals to data lines;

a scan driver for sequentially supplying a scan signal to scan lines;

pixels arranged in crossing points of the scan lines and the data lines and generating visible light having a luminance corresponding to the data signal; and an interface system for transmitting a data between the external system and the timing controller, with the interface system comprising:

a serializer for receiving a first data and second data having a plurality of bits from the system and sequentially outputting bits of the received first data and second data in two bits;

a transmission circuit coupled to the serializer, comprising:

a decoder for converting two bits supplied from the serializer into three bits;

a driver for controlling a flow of electric currents to correspond to the three bits; and a transmission resistor to which a voltage is applied to correspond to the flow of the electric currents;

a reception circuit coupled to the transmission circuit, comprising:

a reception resistor for receiving a voltage supplied the transmission resistor;

amplifiers for amplifying a voltage applied to both ends of the reception resistor;

comparators for recovering the three bits by comparing the voltage supplied to the amplifiers; and an encoder for recovering the two bits using the three bit;

a deserializer for recovering the first data and the second data while sequentially storing the two bits supplied from the reception circuit; and stabilization circuits for controlling the transmission circuit.

* * * * *